US012638582B2

(12) United States Patent
Waller

(10) Patent No.: US 12,638,582 B2
(45) Date of Patent: May 26, 2026

(54) SONAR DIVE RANGING SYSTEM

(71) Applicant: Garmin International, Inc., Olathe, KS (US)

(72) Inventor: Alexander J. Waller, De Soto, KS (US)

(73) Assignee: Garmin International, Inc., Olathe, KS (US)

( * ) Notice: Subject to any disclaimer, the term of this patent is extended or adjusted under 35 U.S.C. 154(b) by 267 days.

(21) Appl. No.: 18/356,320

(22) Filed: Jul. 21, 2023

(65) Prior Publication Data

US 2024/0045056 A1 Feb. 8, 2024

Related U.S. Application Data

(60) Provisional application No. 63/370,194, filed on Aug. 2, 2022.

(51) Int. Cl.
| | |
|---|---|
| *G01S 7/62* | (2006.01) |
| *G01S 7/521* | (2006.01) |
| *G01S 15/88* | (2006.01) |
| *G08B 3/00* | (2006.01) |

(52) U.S. Cl.
CPC .............. *G01S 15/88* (2013.01); *G01S 7/521* (2013.01); *G01S 7/62* (2013.01); *G08B 3/00* (2013.01)

(58) Field of Classification Search
CPC ... G01S 7/62; G01S 15/10; G01S 7/64; G01S 7/521; G01S 15/88; G01S 15/86; G01S 7/6281
See application file for complete search history.

(56) References Cited

U.S. PATENT DOCUMENTS

| | | | | |
|---|---|---|---|---|
| 4,381,144 | A | 4/1983 | Breslau | |
| 4,531,178 | A * | 7/1985 | Uke ...................... | F21V 14/025 |
| | | | | 362/186 |
| 4,635,242 | A * | 1/1987 | Hart .................... | G10K 11/006 |
| | | | | 367/137 |
| 7,145,835 | B2 | 12/2006 | Pope | |

(Continued)

FOREIGN PATENT DOCUMENTS

| | | | |
|---|---|---|---|
| EP | 2641013 A1 | 9/2013 | |
| KR | 20120070122 A * | 6/2012 | ............ F21V 21/406 |

OTHER PUBLICATIONS

Printout from https://bigbluedivelights.com/products/1800-lumen-adjustable-beamsku-cf1800p/, published prior to Jul. 21, 2023.
Printout from https://bigbluedivelights.com/products/2900-lumen-dual-beam-light-wide-narrow/, published prior to Jul. 21, 2023.
Printout from https://diverite.com/product-categories/lights/, published prior to Jul. 21, 2023.
Printout from https://scubapro.johnsonoutdoors.com/us/shop/accessories/lights/nova-850r-dive-light, published prior to Jul. 21, 2023.

(Continued)

*Primary Examiner* — Daniel L Murphy
*Assistant Examiner* — Amie M Ndure
(74) *Attorney, Agent, or Firm* — Samuel M. Korte; Max M. Ali; Kathleen D. Fitterling

(57) ABSTRACT

A handheld underwater sonar system comprising a housing and a sonar transducer housed within the housing. The sonar transducer is configured to generate a sonar signal emittable in a forward direction with respect to the housing. The sonar system additionally comprises a light source housed within the housing. The light source is configured to generate light emittable in the forward direction. The sonar system further comprises a trigger assembly associated with the housing. The trigger assembly is configured to selectively activate the sonar transducer or the light source.

13 Claims, 3 Drawing Sheets

(56) References Cited

U.S. PATENT DOCUMENTS

| | | | | |
|---|---|---|---|---|
| 7,520,629 | B2 * | 4/2009 | Johnson | F21V 21/0885 |
| | | | | 362/253 |
| 7,759,601 | B2 * | 7/2010 | Tamura | B23K 26/032 |
| | | | | 219/121.64 |
| 10,175,356 | B2 | 1/2019 | Hjelmstad | |
| 10,865,949 | B2 * | 12/2020 | Grandadam | F21L 4/027 |
| 2004/0130896 | A1 * | 7/2004 | Brown | F41H 13/0056 |
| | | | | 362/259 |
| 2008/0130268 | A1 * | 6/2008 | Johnson | F21V 21/0885 |
| | | | | 362/103 |
| 2009/0014624 | A1 | 1/2009 | Blees et al. | |
| 2009/0141591 | A1 * | 6/2009 | Basilico | G01S 1/80 |
| | | | | 701/472 |
| 2015/0061895 | A1 * | 3/2015 | Ricci | G06V 40/28 |
| | | | | 340/902 |
| 2019/0162849 | A1 * | 5/2019 | Loncaric | G01S 15/89 |
| 2020/0116314 | A1 * | 4/2020 | Grandadam | F21L 4/027 |
| 2020/0232610 | A1 * | 7/2020 | Raring | G02B 6/0008 |
| 2021/0278584 | A1 * | 9/2021 | Rudy | G02B 6/002 |
| 2022/0333745 | A1 * | 10/2022 | Goutain | G02B 6/0008 |

OTHER PUBLICATIONS

Printout from https://www.diverite.com/wp-content/uploads/2019/08/LX20-Handheld-Primary-Light-User-Manual_Aug-19.pdf, published Aug. 2019.

Printout from https://www.landfallnavigation.com/hawkeye-portable-sonar-system.html?srsltid=AfmBOopes_kSYG1Wt4EjwA_Vf490OY36DMOM6CqC2DMwO9B7i394Tewl, published prior to Jul. 21, 2023.

Printout from https://www.mares.com/en/product/eos-20lrz-415646, published prior to Jul. 21, 2023.

Printout from https://www.orcatorchstore.com/products/orcatorch-d710-max-3000-lumens-small-and-powerful-dive-light?gad_source=1&gad_campaignid=23078890203&gclid=EAlalQobChMIrpTrz7XqkAMVxkn_AR3uxRKmEAAYASABEgL8bvD_BWE, published prior to Jul. 21, 2023.

* cited by examiner

10

| 20 SONAR TRANSDUCER | 30 FIRST LIGHT SOURCE | 40 SECOND LIGHT SOURCE |
| 50 POWER SOURCE | 52 PROCESSING ELEMENTS | 54 MEMORY ELEMENTS |
| 56 GRAPHIC DISPLAY | 58 USER CONTROLS | 60 COMMUNICATION ELEMENT |
| 70 DEPTH SENSOR | 72 SPEAKER | |

10

SONAR DIVE RANGING SYSTEM

CROSS-REFERENCE TO RELATED APPLICATION

The present non-provisional application claims priority benefit to U.S. Provisional Patent Application Ser. No. 63/370,194, filed on Aug. 2, 2022, and entitled "SONAR DIVE RANGING SYSTEM." The entirety of the above-identified provisional patent application is hereby incorporated by reference into the present non-provisional application.

FIELD

Embodiments of the present invention are directed to sonar systems. More particularly, embodiments of the present invention are directed to a handheld sonar system that can be used by an underwater diver to, inter alia, accurately determine and present range information for objects in the area within which the diver is diving.

DESCRIPTION OF RELATED ART

Underwater diving is a complex activity. Divers are often required to carry and operate a number of different tools to perform diving activities in a safe manner. For example, many areas within which a diver is diving will be dark, such that the diver will be required to carry a light source to illuminate the area. In addition, a diver is generally required to be constantly aware of the diver's current depth and any rates of change of the diver's depth. Such information is commonly provided by pressure sensors that are provided by gauges or electronic devices carried by the diver. However, many range-determining systems, such as sonar systems, are large and cumbersome to carry and operate.

SUMMARY

Embodiments of the present invention comprise a handheld underwater sonar system comprising a housing and a sonar transducer housed within the housing. The sonar transducer is configured to generate a sonar signal emittable in a forward direction with respect to the housing. The sonar system additionally comprises a light source housed within the housing. The light source is configured to generate light emittable in the forward direction. The sonar system further comprises a trigger assembly associated with the housing. The trigger assembly is configured to selectively activate the sonar transducer or the light source.

Embodiments of the present invention additionally include a handheld underwater sonar system comprising a housing, a sonar transducer, and a light source. The sonar transducer and the light source are supported by the housing in general alignment with each other such that when the light source is directed towards a target object, the sonar transducer can emit a sonar signal also directed towards the target object.

This summary is not intended to identify essential features of the present invention, and is not intended to be used to limit the scope of the claims. These and other aspects of the present invention are described below in greater detail.

BRIEF DESCRIPTION OF THE DRAWINGS

Embodiments of the present invention are described in detail below with reference to the attached drawing figures, wherein.

Figures 1, 2:
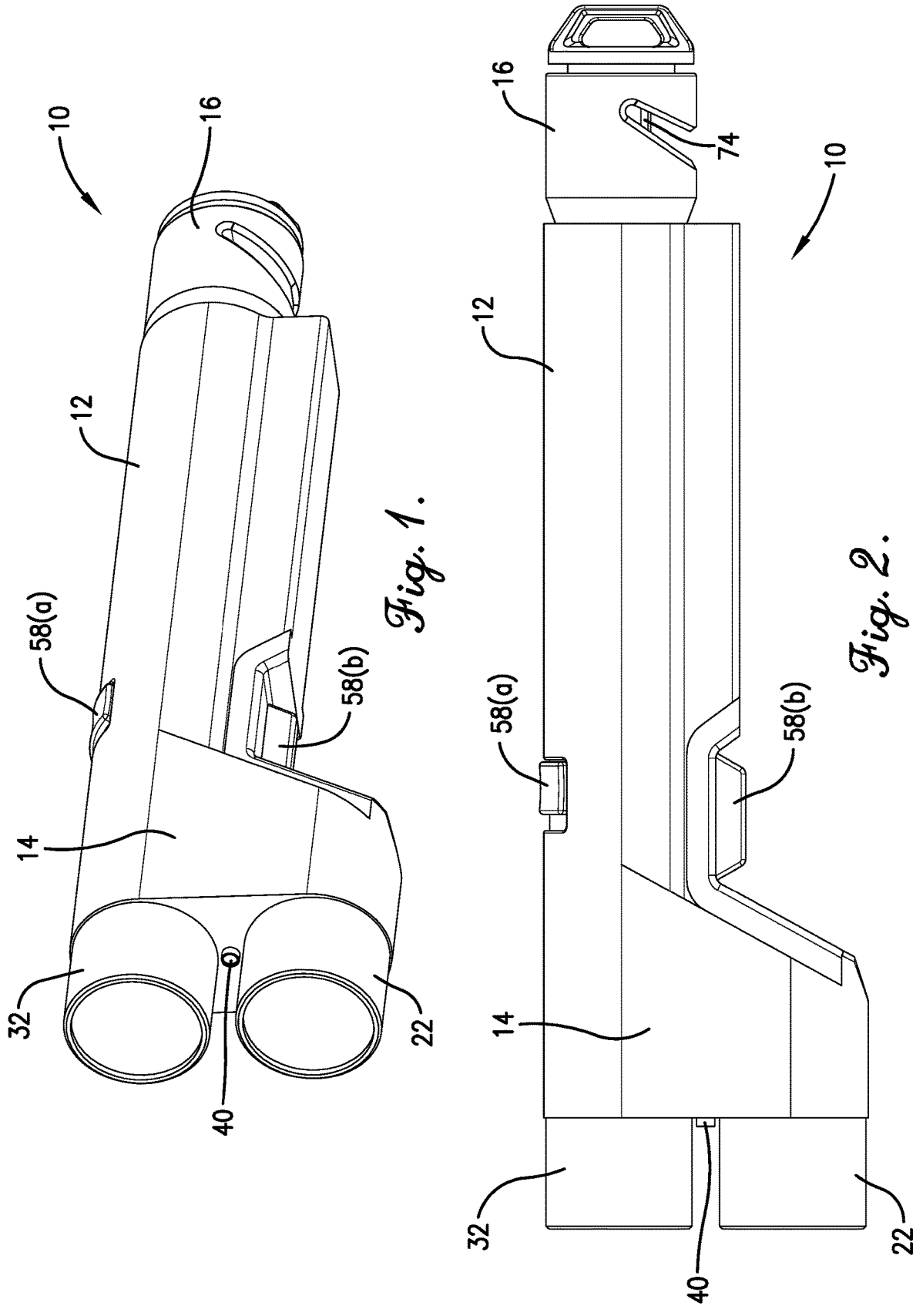
FIG. 1 is a perspective view of a handheld sonar system according to embodiments of the present invention.
FIG. 2 is a side elevation view of the handheld sonar system from FIG. 1.

The figures are not intended to limit the present invention to the specific embodiments they depict. While the drawings do not necessarily provide exact dimensions or tolerances for the illustrated structures or components, the drawings are to scale with respect to the relationships between the components of the structures illustrated in the drawings.

DETAILED DESCRIPTION

The following detailed description of embodiments of the invention references the accompanying figures. The embodiments are intended to describe aspects of the invention in sufficient detail to enable those with ordinary skill in the art to practice the invention. The embodiments of the invention are illustrated by way of example and not by way of limitation. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, component, action, step, etc. described in one embodiment may also be included in other embodiments, but is not necessarily included. Thus, particular implementations of the present invention can include a variety of combinations and/or integrations of the embodiments described herein.

Embodiments of the present invention are directed to handheld sonar systems, e.g., sonar system 10 illustrated in FIGS. 1 and 2, which are configured to be used by a diver performing underwater diving activities to provide various functions to the diver as the diver performs such activities. For example, as will be described in more detail below, the sonar system 10 may be configured to accurately determine ranging information (i.e., distance information) with respect to surrounding objects in the area within which the diver is diving. In addition, in some embodiments, the sonar system 10 may be configured to illuminate the area within which the diver is diving. Various embodiments of the sonar system 10 may also provide other functions, as will be described in more detail below.

As illustrated in FIGS. 1 and 2, the sonar system 10 may include a housing that is at least partly hollowed to encloses various components of the sonar system 10. Certain of such components are illustrated schematically in FIG. 3 and are described in more detail below. Returning to FIGS. 1 and 2, the housing may be elongated and may comprise a central, handle section 12, a head section 14, and an end section 16. As shown, the handle section 12 may extend between the head section 14 and the end section 16. As noted, the sonar system 10 may be configured to be grasped by the hand of a diver when underwater diving. As such, the sonar system 10, and the housing in particular, may have dimensions that facilitate grasping by a human hand (which may be gloved). For instance, the sonar system 10 may, in some embodiments, have a length from five to thirty-six inches, from eight to twenty-four inches, or about sixteen inches. In addition, the sonar system may have a width and a height from two to ten inches. In some embodiments, the handle section 12 may be particularly configured for grasping by the hand of a diver, such as having a width and a height from two to six inches. In some embodiments, the head section 14 of the housing may have a larger width and height than the handle section 12. For example, the head section 14 may have a width and a height that is about twice the size of the handle section 12.

Figure 3:
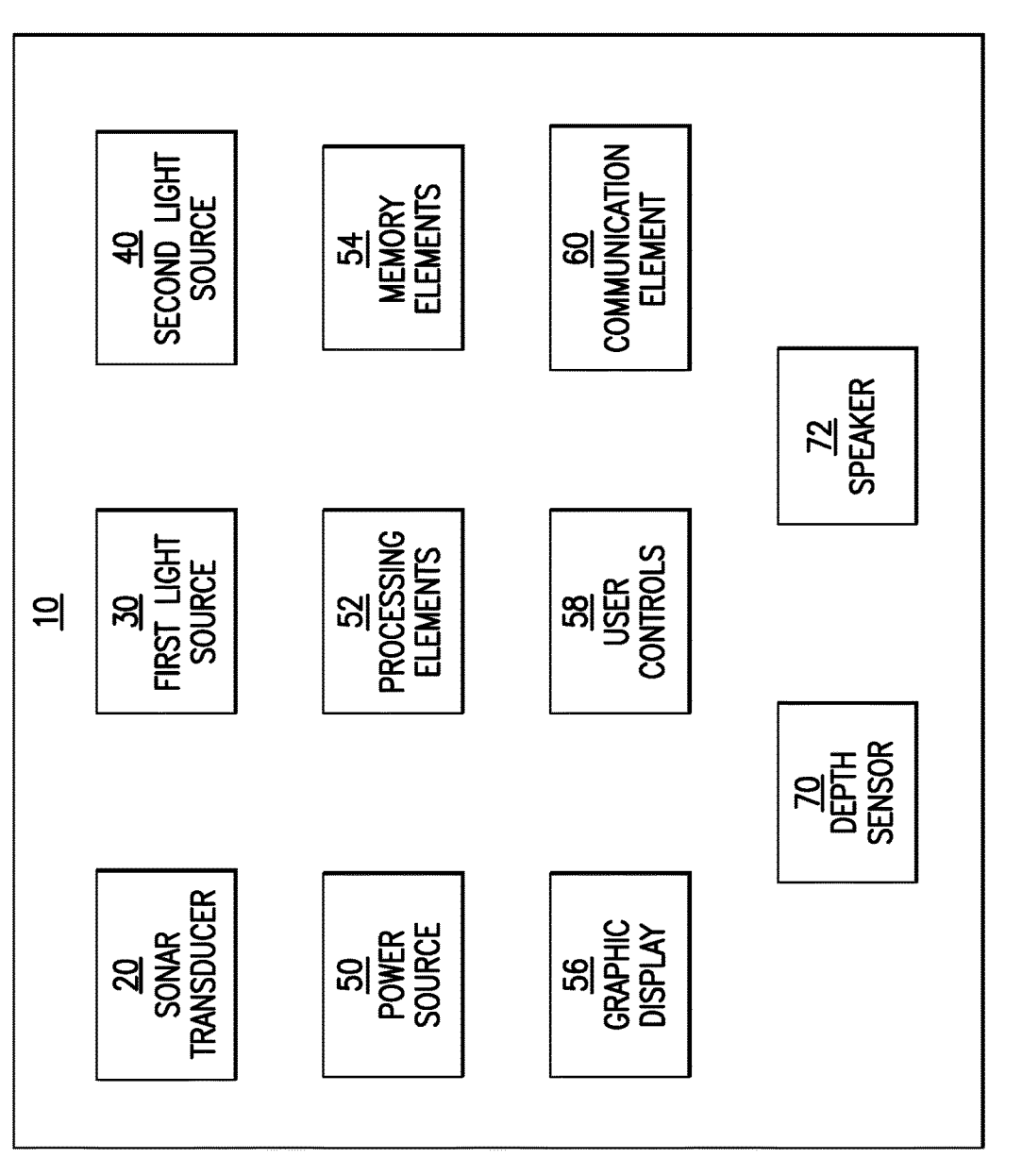
FIG. 3 is a schematic diagram of components of the handheld sonar system from FIGS. 1 and 2.

Turing to FIG. 3, the sonar system 10 may, in some embodiments, comprise a sonar transducer 20 configured to generate a sonar signal emittable by the sonar system 10. As is generally understood, a sonar signal is an acoustic signal, or pulse of sound, that can travel through the water. Such a signal is configured to bounce, or be reflected, off a target object and return to the sonar transducer 20, wherein the sonar system 10 can calculate a range (or distance) from the target object to the sonar system 10. The sonar transducer 20 may be generally any type of mechanism configured to generate a sonar signal. However, in some embodiments, the sonar transducer 20 may be configured to generate a conical sonar signal. For example, the sonar transducer 20 may comprise a piezoelectric transducer that is puck shaped (e.g., a 26 mm sonar transducer). In certain embodiments, the sonar transducer 20 may be positioned within the housing of the sonar system 10, such that the sonar transducer 20 is configured to generate a sonar signal emittable in a forward direction with respect to the housing of the sonar system 10. In some embodiments, the sonar transducer 20 may be positioned within the head section 14 of the housing.

In more detail, as shown in FIGS. 1 and 2, the head section 14 of the housing may include a sonar reflector cone 22 that extends forward from remaining portions of the head section 14. This sonar reflector cone 22 may aid in guiding the sonar signals emitted from the sonar transducer 20 in the general direction in which the sonar system 10 is being aimed (i.e., in the forward direction). In some embodiments, at least a portion of the sonar transducer 20 may be received within the sonar reflector cone 22.

It is understood that the term "front," as used herein with respect to the sonar system 10, means the portion of the sonar system 10 located adjacent to the head section 14 of the housing (e.g., a left-most portion of the sonar system 10 as shown in FIG. 2). In contrast, the term "rear" or "back," means the portion of the sonar system 10 located adjacent to the end section 16 of the housing (e.g., a right-most portion of the sonar system 10 as shown in FIG. 2). Correspondingly, the terms "upper," "top," "lower," or "bottom" are used in reference to the sonar system 10 being orientated as shown in FIG. 2. As such, the term "forward," as used herein such as to refer to a direction of propagation of the sonar signal means a direction extending generally along a length, or longitudinal axis, of the sonar system 10 away from the head section 14 of the housing (i.e., leftward with reference to the sonar system 10 shown in FIG. 2).

In addition to the sonar transducer 20, the sonar system 10 may include one or more light sources configured to illuminate the area around the sonar system 10 and/or to illuminate a target object at which the diver wishes to obtain range information with the sonar transducer 20. In more detail, with reference to FIG. 3, the sonar system 10 may include a first light source 30, which may comprise a visible light source configured to emit a relatively large beam of incoherent, visible light so as to illuminate the area around the sonar system 10 in the direction the sonar system 10 is pointing (i.e., in a forward direction). In some embodiments, the first light source 30 may comprise a 2000 lumen spotlight. The first light source 30 may comprise an incandescent bulb, one or more light-emitting diodes, or the like. In some embodiments, the first light source 30 may be positioned within the head section 14 of the housing. Specifically, as illustrated in FIGS. 1 and 2, the head section 14 of the housing may include a light reflector cone 32 that extends forward from remaining portions of the head section 14. This light reflector cone 32 may aid in guiding the light waves emitted from the first light source 30 in the general direction in which the sonar system 10 is being aimed (i.e., in the forward direction). In some embodiments, at least a portion of the first light source 30 may be received within the light reflector cone 32. As shown in FIGS. 1 and 2, the light reflector cone 32 may be positioned above the sonar reflector cone 22.

In some embodiments, the first light source 30 may be configured with various functionalities. For example, the first light source 30 may be configured to strobe (i.e., flash on and off). In addition, the intensity and color of the light being emitted by the first light source 30 may be adjustable. Furthermore, the width of the light beam emitted by the first light source 30 may be adjustable (e.g., to narrow or widen the beam). Such adjustments to the first light source 30 may be made manually, such as by adjusting/rotating the light reflector cone 32 or by selecting appropriate switches or buttons (described in more detail below). In other embodiments, certain of such adjustments to the light emitted by the first light source 30 may be made automatically by control elements of the sonar system 10, e.g., by processing elements of the sonar system 10 discussed in more detail below.

The sonar system 10 may additionally include, as illustrated in FIGS. 1-3, a second light source 40, which may comprise a laser light source configured to emit a relatively narrow beam of coherent, visible light so as to identify a target object in the direction the sonar system 10 is pointing (i.e., in a forward direction). In some embodiments, the second light source 40 may comprise a laser pointer having a wavelength from 450 to 525 nm. In some embodiments, the second light source 40 may be positioned within the head section 14 of the housing. Specifically, as illustrated in FIGS. 1 and 2, the second light source 40 may extends at least partly forward from the remaining portions of the head section 14 of the housing, such that the second light source 40 can emit laser light in the direction in which the sonar system 10 is pointing (i.e., in the forward direction). As shown in FIGS. 1 and 2, the second light source 40 may be positioned between the sonar reflector cone 22 and the light reflector cone 32. As such, the second light source 40 is positioned generally adjacent to the sonar transducer 20, such that the second light source 40 emits laser light that is generally aligned with the sonar signals emitted from the sonar transducer 20. In such a configuration, each of the sonar transducer 20, the first light source 30, and the second light source 40 are generally aligned to emit light and/or signals in essentially the same direction (e.g., in the forward direction).

In addition to the above, the sonar system 10 may include various other components that facilitate the various functions of the sonar system 10. For example, as shown in FIG. 3, the sonar system 10 may include a power source 50 that provides electrical power to the various components of the sonar system 10. In some embodiments, the power source 50 may comprise one or more batteries that can be positioned within the handle section 12 of the housing. For instance, the end section 16 of the housing may be removed from the handle section 12 via a threaded connection, such that the batteries can be removed from the interior space of the housing (e.g., to be replaced when the batteries have been depleted of charge and new batteries are required to be inserted). In other embodiments, the batteries may be re-chargeable, such as through a re-charging port associated with the housing of the sonar system 10.

In addition, the sonar system 10 may include one or more processing elements 52, which may include one or more processors, microprocessors, microcontrollers, field pro-grammable gate arrays, and the like, or combinations thereof. The sonar system 10 may also include one or more memory elements 54, which may be capable of storing or retaining computer programs and may also store data, typi-cally binary data, including text, databases, graphics, audio, video, combinations thereof, and the like. The memory elements 54 may also be known as a non-transitory "com-puter-readable storage medium" and may include random access memory (RAM), read only memory (ROM), flash drive memory, hard disk drives, optical storage media, and the like, or combinations thereof. In general, the memory elements 54 may be configured to store all of the applicable information described herein, which is used to carry out the various functions, methods, and/or processes of embodi-ments of the present invention described herein. Such func-tions, methods, and/or processes may be performed (at least partly) by the processing elements 52 of the sonar system 10 executing the computer program stored on the memory elements 54.

In certain embodiments, the sonar system 10 may be configured to graphically present data to the diver. As such, the sonar system 10 may include a graphic display 56, as illustrated schematically in FIG. 3. In some embodiments, the graphic display 56 may be integrated with external portions of the housing of the sonar system 10, so as to be visible to the diver when using the sonar system 10. The graphic display 56 may comprise any device configured to present data in a graphical format, such as an LCD (Liquid Crystal Diode) display, a TFT (Thin Film Transistor) LCD display, an LEP (Light Emitting Polymer) or PLED (Poly-mer Light Emitting Diode) display, and/or the like, which are configured to display text and/or graphical information to a user (e.g., a diver), such as in the form of a graphical user interface (GUI). The graphic display 56 may be backlit via a backlight such that it may be viewed in the dark or other low-light environments. In some embodiments, the graphic display 56 may be configured as a touchscreen to receive input (e.g., data, commands, etc.) from a user. For example, a diver may control certain functions of the sonar system 10 by touching the touchscreen and/or by performing gestures on the touchscreen. In some embodiments, the touchscreen may be a capacitive touchscreen, a resistive touchscreen, an infrared touchscreen, combinations thereof, and the like.

In additional embodiments, the sonar system may also include other types of user controls 58, which may comprise input/output (I/O) components, such as a keypad, buttons, switches, a wireless input device, a thumbwheel input device, a trackstick input device, and the like. For example, the user controls 58 may include a first switch/button 58(a) positioned on a top side of the handle section 12 of the housing of the sonar system 10 and a second switch/button 58(b) position on a bottom side of the handle section 12 of the housing of the sonar system 10. The sonar system 10 is generally configured so that a diver's hand can grasp the handle section 12 of the housing, with the diver's thumb positioned on the top side of the housing and the user's index finger positioned on the bottom side. As such, in a normal grasping position, the diver's thumb will be positioned adjacent to the first switch/button 58(a), and the diver's index finger will be positioned adjacent to the second switch/button 58(b).

Furthermore, the sonar system 10 may also include a communication element 60 configured to permit the sonar system 10 to send/receive data between different external devices (e.g., components/peripherals) over one or more communications networks. The communication element 60 may include various communication components and func-tionality including, but not limited to: one or more antennas; a transmitter, receiver, and/or transceiver; a wireless radio; data ports; software interfaces and drivers; networking inter-faces; data processing components; and so forth. The net-works over which the communication element 60 may communicate include various wired and wireless networks, such as a local area network, a wide area network, an intranet, the Internet; a satellite network; a cellular network; a mobile data network; and the like. Specific examples wireless networks include, but are not limited to: networks configured for communications according to: one or more standard of the Institute of Electrical and Electronics Engi-neers (IEEE), such as 802.11 or 802.16 (Wi-Max) standards; Wi-Fi standards promulgated by the Wi-Fi Alliance; Blu-etooth standards promulgated by the Bluetooth Special Interest Group; and so on. Wired communications are also contemplated such as through universal serial bus (USB), Ethernet, serial connections, and so forth.

Figure 4:
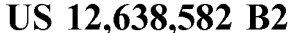
FIG. 4 is a perspective environmental view of an underwater diver using the handheld sonar system from FIGS. 1-3 while diving underwater.

In view of the above, the sonar system 10 can be used by a diver conducting underwater diving activities, such as illustrated in FIG. 4, to illuminate the area around the diver, as well as to obtain ranging (i.e., distance) information for target objects within the area. Notably, the sonar system 10 is configured with fluid sealing to prevent water from entering the interior space of the housing when diving underwater (e.g., up to a depth of at least twenty atmo-spheres), which might damage the electrical components of the sonar system 10. In addition, the housing of the sonar system 10 is preferably configured with sufficient structural integrity to withstand significant pressures encountered dur-ing deep, underwater diving activities.

Returning to the operation of the sonar system 10, when diving, the diver may grasp the sonar system 10 in the diver's hand (see, e.g., FIG. 4) by clasping the handle section 12 of the housing. The diver can actuate the first switch/button 58(a), which may be in the form of a slide switch, to activate the first light source 30. A such, the sonar system 10 can emit a relatively large beam of incoherent visible light to illuminate the area around the diver in the forward direction. If the diver sees a target object (e.g., sea floor, reef, shelf, debris, vessel, etc.) that the diver would like to know the range or distance to, the diver can activate the second light source 40 to emit laser light from the sonar system 10 and to project such laser light onto the target object to provide a visual reference point. As such, the second light source 40 can be used to ensure that the sonar system 10 (and particularly the sonar transducer 20) is being properly aimed at the target object. Once the sonar system 10 is properly aimed at the target object, the diver can activate the sonar transducer 20 to emit a sonar signal towards the target object. This sonar signal will reflect from the target object, and the reflected sonar signal will be received by the sonar transducer 20. The sonar system 10 may, e.g., via operation of the processing elements 52, calculate the range/distance between the sonar system 10 and the target object using the reflected sonar signal.

The diver may use the second switch/button 58(*b*) to activate both the second light source 40 and the sonar transducer 20. For example, the second switch/button 58(*b*) may be configured as a trigger assembly that can be either partially depressed or fully depressed. However, first switch/button 58(*a*) or any other user control 58 may be configured as the trigger assembly. When the diver partially depresses or otherwise actives that trigger assembly, the second light source 40 can be activated so as to emit the laser light in the forward direction. Whereas when the diver fully depresses the trigger assembly, the sonar transducer 20 can be activated so as to emit a sonar signal in the forward direction (in general alignment with the laser light). Stated differently, the trigger assembly may comprise comprise a multiple-stage trigger, such that partially activating the trigger activates the second light source 40 and fully activating the trigger activates the sonar transducer 20. The trigger assembly and/or associated user controls may be used to activate any functions of system 10, and combination of functions, such as the sonar transducer 20 and first light source 30. The functions activated by the trigger assembly may be configurable by the user.

Upon the sonar system 10 calculating range/distance information to the target object, such range/distance information may be provided to the diver, such as by being displayed on the graphic display 56. In other embodiments, the sonar system may transmit, via the communication element 60, the range/distance information to an external device, such as a diver's watch, a dive computer, an earpiece, an underwater communication system, goggle-mounted display, and/or other device or tool associated with the diver.

In addition to the range/distance information, the sonar system 10 may be configured to determine depth information. Such depth information may be obtained via depth sensors 70, which as shown in FIG. 3, may be pressure sensors (or other suitable sensors) associated with the sonar system 10. The depth information, which may include a current depth of the diver/sonar system 10 below the surface of the water, may be displayed on the graphic display 56 or transmitted to an external device. In additional embodiments, the sonar system 10 may, via the processing elements 52, be configured to calculate and display/transmit a rate of ascent/descent of the diver/sonar system 10 based on the depth information obtained by the depth sensors 70. Furthermore, the sonar system 10 may include a speaker 72 or other audible tone generator configured to provide an alert to the diver, such as when the diver has exceeded a maximum diving depth and/or when the diver's rate of ascent/descent is too high. In some examples, the system 10 may additionally include a compass, such as an electronic magnetometer, analog mechanical compasses, and/or the like. Such functionality may aid in orienting the diver while underwater. The heading information may be displayed on the display 56 and/or transmitted to an external device.

Finally, as shown in FIGS. 1 and 2, the end section 16 of the housing of the sonar system may include a knife element 74 with a blade. Such knife element may be used by the diver to perform cutting of materials (e.g., tubing, rope, cloth, etc.) during underwater diving activities.

The system 10 may use communications element 60 to communicate with one or more external devices such as a diving watch (smartwatch), a dive computer, a heads-up display, a networked buoy, combinations thereof, and the like. Such functionality enables the external device, such as the diver's watch, to display information regarding the status of system 10 and to control the system 10 itself. The communications element 60 may be configured to establish a wireless communication link with the external devices. The wireless communication link may use any suitable protocol such as Bluetooth, Wi-Fi, Zigbee, or the like. The external devices may be located in proximity to the system 10 or may be located remotely. For example, the diving watch may be worn by the diver and may be in close proximity to the system 10, while the networked buoy may be located at a remote location and may communicate with the system 10 over a cellular network.

In addition to displaying information regarding the status of system 10, the external device may also be configured to receive and store data from the system 10. For example, the external device (e.g., dive computer or dive watch) may receive and store information such as depth (distance), temperature, and duration of the dive. The external device may also be configured to display the data in a user-friendly manner, such as a graph or a chart. The external device may also create underwater maps of the terrain surrounding the diver based on distance information received from the system 10 and position information (depth, location) corresponding to the diver.

The external device may also be configured to control the system 10. For example, the diving watch may be configured to adjust the settings of the system 10 such as sonar and illumination settings. The external device may also be configured to initiate certain functions of the system 10 such as starting or stopping one or more of its lights, activating a safety feature such as a strobe, or entering a calibration mode. For example, in a paired dive, one diver may control the other diver's system 10, such as by causing the other diver's system 10 to illuminate, to assist in locating the diver in dark conditions.

In some examples, the system 10 may also include an optical camera configured to generate images (still and/or moving) of the underwater environment. In some configurations, the camera can be activated along with the light source 30 so that images (still and/or moving) are automatically and constantly recorded as long as light source 30 is activated. The optical axis of the optical camera may be aligned with the axis of the light source 30 to ensure that the camera captures the area illuminated by the light source 30. Depressing switch/button 58(*b*) may cause both the light source 30 to illuminate and the optical camera to begin recording. The diver may therefore easily record video of his or her dive—and ensure the subject is properly illuminated—without having to activate extra buttons or stand-alone cameras. Images captured by the optical camera may be stored internally by the system 10 for later playback and retrieval and/or transmitted to external devices by the communications element 60.

The system 10 described above may also include an audio recorder such as a microphone configured to capture sounds in the underwater environment. In some embodiments, the audio recorder may be activated along with the optical camera and light source 30, such that audio recordings are automatically synchronized with the visual recordings. For instance, depressing switch/button 58(*b*) may cause all three components to activate simultaneously, allowing the diver to capture a complete sensory experience of the dive.

In various embodiments, the system 10 is configured to provide a scan mode, where the diver may take multiple range measurements, at one or more headings/directions, from a fixed location. The multiple range measurements, and their corresponding direction, may be presented on the display 56 to provide situational awareness to the diver so that he or she may easily understand the relative ranges to the surrounding underwater objects.

In additional embodiments, the system 10 may incorporate a mapping functionality to enhance the situational awareness of the diver. By utilizing a combination of the multiple range measurements obtained in the scan mode and the diver's movements, the system 10 can generate a visual representation of the underwater environment. This mapping functionality, displayed on the display 56, allows the diver to have a comprehensive view of the relative ranges and locations of the surrounding underwater objects in real-time. The mapping functionality may further include the ability to annotate or mark specific points of interest, providing the diver with a means to navigate and reference important locations during the dive.

Furthermore, the system 10 may include a tracking feature to track the movements of the diver within the underwater environment. By integrating sensors and position tracking technology, the system 10 is able to determine the diver's position and update it in real-time. This information can be overlaid on the mapping functionality displayed on the display 56, providing the diver with accurate and up-to-date information on their own position relative to the surrounding underwater objects. Additionally, the tracking feature can be used to record and store the diver's path and movements, allowing for post-dive analysis and review.

In some embodiments, the system 10 may also include a communication functionality to enable communication between multiple divers using similar systems. This communication functionality can be implemented through wireless communication protocols, allowing divers to share their range measurements, mapping data, and tracked positions with each other. By establishing a network of interconnected systems, the divers can enhance their situational awareness not only by relying on their individual measurements but also by gaining insights from the measurements and data collected by other divers.

The preferred forms of the invention described above are to be used as illustration only and should not be used in a limiting sense to interpret the scope of the present invention. Modifications to the exemplary embodiments, set forth above, could be readily made by those skilled in the art without departing from the spirit of the present invention. For example, although the sonar system 10 is illustrated by the elongated device shown in FIGS. 1 and 2, it is contemplated that the sonar systems according to embodiments of the present invention may include or be incorporated with other types of devices, such as a diver's watch, a dive computer, dive goggles, or the like.

The invention claimed is:

1. A handheld underwater sonar system comprising:

a housing, wherein the housing is elongated with a head section, an end section, and a handle section extending between the head section and the end section;

a sonar transducer housed within the head section, wherein the sonar transducer is configured to generate a sonar signal emittable in a forward direction with respect to the housing;

a light assembly housed within the head section and configured to generate light emittable in the forward direction, wherein the light assembly comprises one or more light sources positioned adjacent to the sonar transducer, the light sources being laterally offset from the sonar transducer and not disposed in a circumferential arrangement around it, and wherein one or more characteristics of the emitted light are adjustable;

a control unit associated with the housing, wherein the control unit comprises a switch configured to selectively activate the sonar transducer and a rotatable control configured to adjust at least one characteristic of the emitted light;

a compass sensor configured to determine a heading of the housing; and a graphic display mounted to the housing and configured to display heading information and sonar range information.

2. The sonar system of claim 1, wherein the sonar system is configured to be used by a diver when diving underwater.

3. The sonar system of claim 2, wherein the handle section is configured to be grasped by a hand of the diver.

4. The sonar system of claim 1, wherein the sonar transducer comprises a piezoelectric transducer configured to generate a conical sonar signal.

5. The sonar system of claim 1, wherein one of the one or more light sources comprises a laser.

6. The sonar system of claim 1, wherein one or more of the light sources comprises an incoherent, visible light source configured to generate a visible beam of light in the forward direction.

7. The sonar system of claim 1, wherein the emitted sonar signal is configured to be reflected off a target object, such that a reflected sonar signal can be received by the sonar system, and wherein the sonar system further comprising a processing element configured to calculate a distance to the target object based on the reflected sonar signal.

8. The sonar system of claim 7, wherein the sonar range information displayed on the graphic display comprises the distance to the target object.

9. The sonar system of claim 8, further comprising a depth sensor configured to generate depth information for the sonar system, and wherein the graphic display is configured to display the depth information.

10. The sonar system of claim 9, wherein the depth information is a depth below a surface of the water and/or a rate of ascent or descent.

11. The sonar system of claim 1, further comprising a transmitter configured to transmit information to an external device.

12. The sonar system of claim 1, further comprising a speaker configured to generate an audible alert.

13. The sonar system of claim 1, further comprising a cutting knife configured to cut material.

* * * * *